INVENTOR.
Howard W. Christenson
BY
J. C. Thorpe
ATTORNEY

United States Patent Office 2,916,999
Patented Dec. 15, 1959

2,916,999

VARIABLE DISCHARGE VANE PUMP

Howard W. Christenson, Indianapolis, Ind., assignor to General Motors Corporation, Detroit, Mich., a corporation of Delaware Application May 25, 1956, Serial No. 587,317

4 Claims. (Cl. 103—40)

This invention relates to fluid pumps and in its most specific aspect concerns a hydraulic servo pump capable of providing the relatively high fluid pressures required for the operation of equipment carried by heavy off-the-road vehicles, e.g. steering apparatus, dump mechanism, etc.

A principal object of the invention is to provide a pump meeting the indicated requirements which is long lasting and virtually infallible in operation.

Another object is to provide such a pump which is of simple design and readily manufacturable at low cost.

A still further object is to provide suitable control means for such a pump whereby the pressure in the discharge line is not permitted to exceed a predetermined value.

Additional objects and features of the invention will become apparent from the following description of a preferred embodiment thereof. The description will proceed with reference to the accompanying drawings in which.

Figure 1:
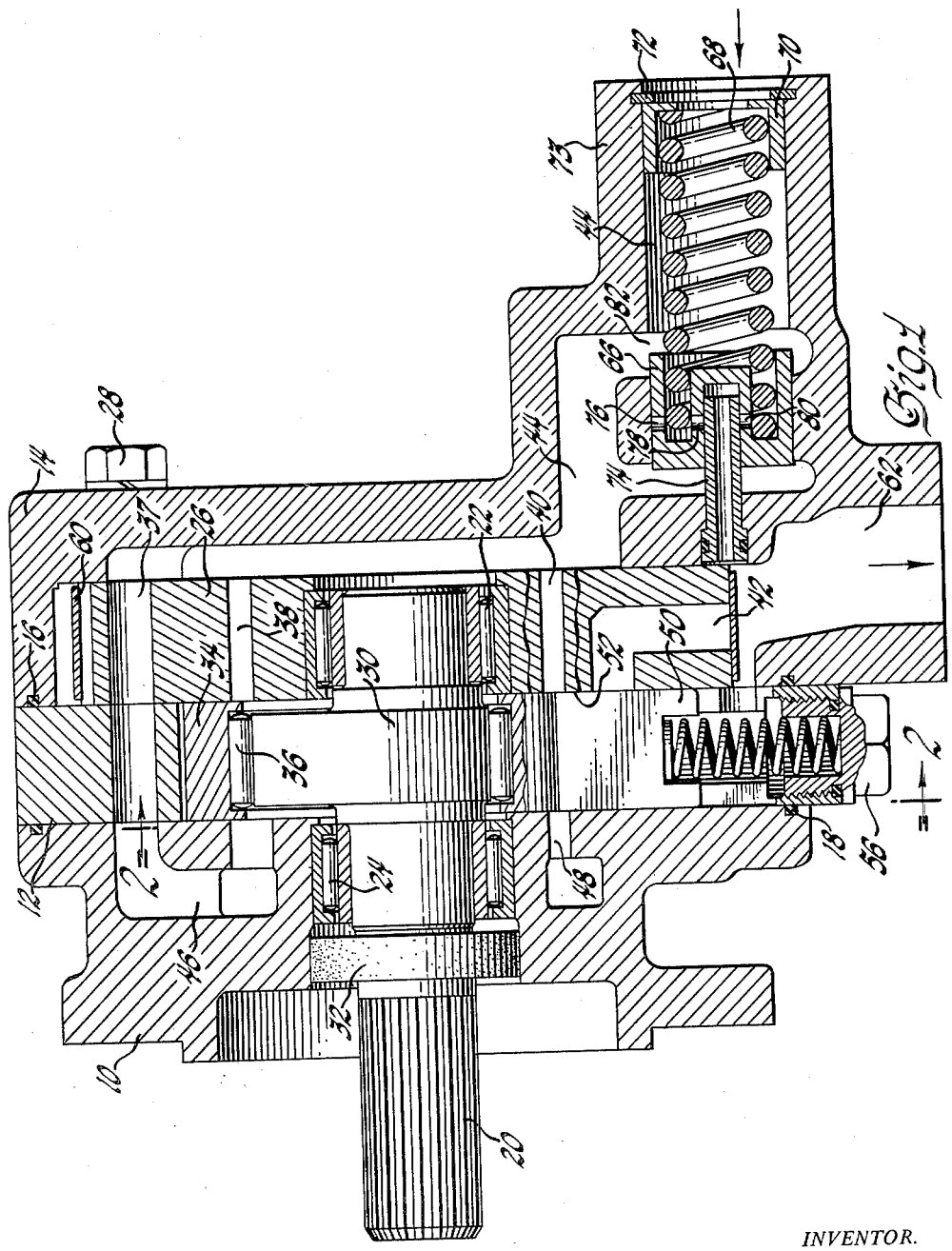
Figure 1 is a vertical section on the line 1—1 of Fig. 2.

As shown in Figure 1, the pump includes a housing comprising three components 10, 12, and 14, parts 10 and 14 being suitably recessed to accommodate seals 16 and 18. The pump is powered via a splined shaft 20 turning in roller bearings 22 and 24 having the usual inner and outer races. Bearing 22 will be seen as confined within a ring member 26, in turn surrounded by the housing portion 14 to which it is secured via bolts 28 (Fig. 1). Outward of the bearing 24 and encircling the drive shaft 20 is a sealing element 32.

An eccentric 30 formed integral with the shaft 20 is spaced from a cam ring 34 via rollers 36. The cam ring 34 rotates between the ring piece 26 and housing member 10.

Ring piece 26 is to be noted as ported at 37, 38, 40, and 42 to provide fluid passageways. Passageways 38 and 40 are inlet passageways served from a common inlet 44, while passageway 42 is a discharge passageway. Passageway 37, open to the common inlet 44, communicates via a port in the central housing member 12 with a passageway 46 formed in the housing member 10. Similarly, inlet passageway 40 communicates via a port (not shown) in the center housing member 12 with a passageway 48 in the housing member 10.

If desired, ported wear plates may be interposed at either side of the central housing member 12.

Figure 2:
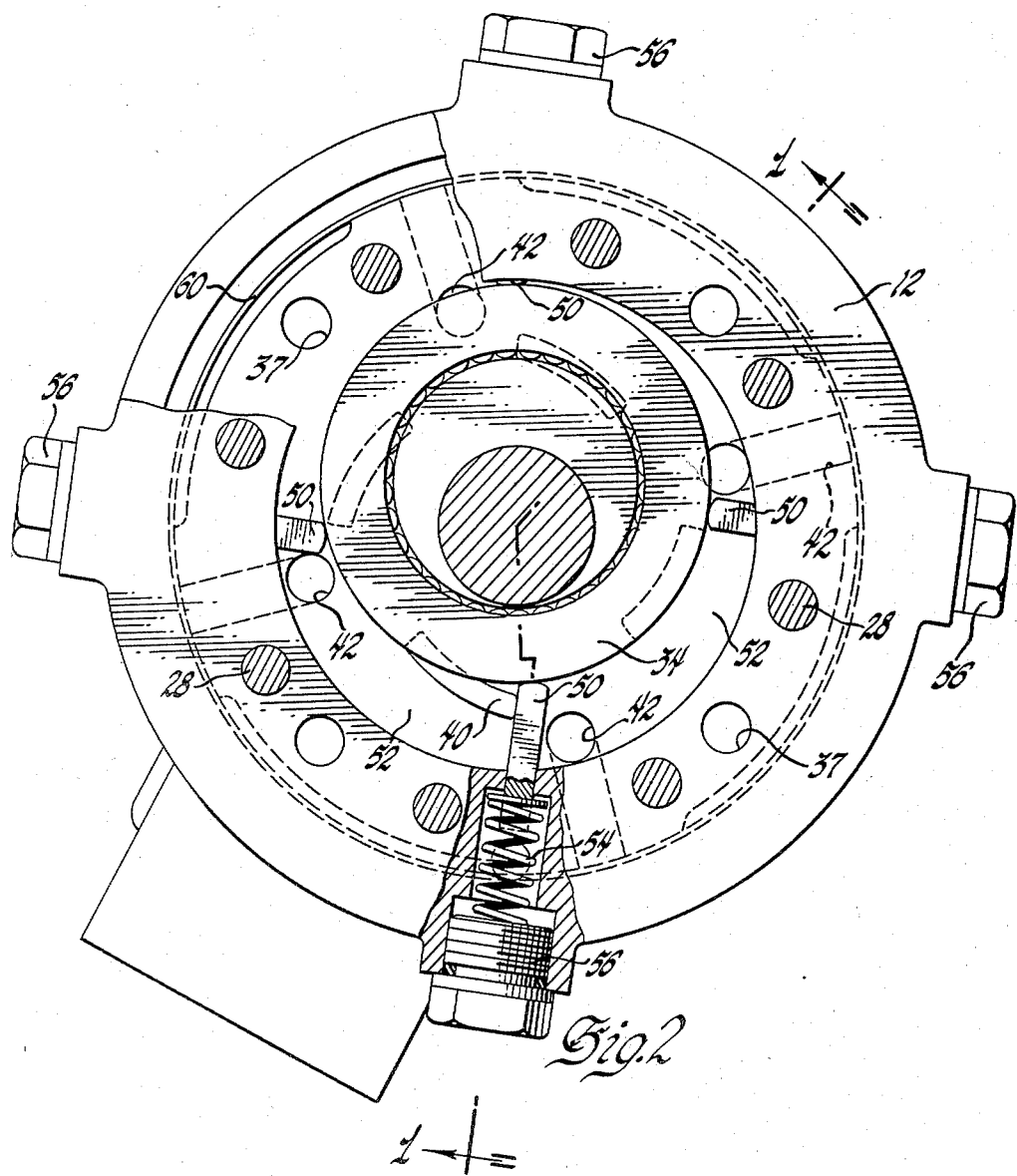
Figure 2 is a section on the line 2—2 in Fig. 1, certain parts being shown broken away.

As the cam ring 34 rotates, it induces reciprocation of the abutments 50 (Fig. 2) varying the volumetric capacity of the chambers 52 delineated by the abutments. The abutments are maintained in contact with the cam ring by springs 54 seating on plugs 56 threaded into the housing member 12. Alternatively, discharge pressure may be applied to load the abutments.

Ring piece 26 will be seen as surrounded by a band 60, seated with a slight clearance about the ring piece, and serving as the discharge valve. Thus, as the pressure in the discharge passageway 42, for example, builds up as the eccentric rotates to reduce the volumetric capacity of the corresponding chamber 52, the band is forced downwardly so that the passageway becomes open to the common discharge passageway 62. This action of the band is accompanied by tightening thereof about the ring piece in the areas of the discharge passageways corresponding to the intaking chambers 52, which are thus efficiently charged with fluid for later discharge on the further rotation of the cam ring 34.

To limit the pressure which may develop in the common discharge passageway 62 there is provided a valve 66 loaded by a spring 68 abutting a seat 70 backed by an expansion ring 72 accommodated in the boss portion 73 of the housing member 14. Valve 66 is formed to receive a tubular element 74 and is apertured at 76, 78, and 80. Element 74 will be seen as open to the common discharge passageway 62.

With the arrangement as described and illustrated, whenever the pressure in the common discharge passageway 62 reaches a certain value with reference to which the spring 68 is gauged, valve 66 is shifted rightwardly to progressively restrict or close the common inlet passageway 44. Should the pressure at 62 become sufficiently high, the valve 66 becomes displaced to an extent such that apertures 76, 78, and 80 gain registry with the inlet at 82 with the result that the pump idles, i.e. cycles on its own discharge.

Having thus described and illustrated the invention, what is claimed is:

1. A pump including: a first housing member having a plurality of inlet openings therein, a second housing member comprising inlet and discharge cavities and an inlet port serving said inlet cavity, said second housing member having fixed thereto a ring member rotatably supporting, with said first housing member, a drive shaft carrying cam means, said ring member having therein a plurality of inlet openings registering with said first-mentioned inlet openings, a plurality of inlet passages serving said first-mentioned inlet openings and a plurality of discharge passages, said inlet openings in said ring member and said inlet passages communicating with said inlet cavity, means mediate said first housing member and said ring member yieldably supporting a plurality of abutments engaging said cam means, said abutments delineating a plurality of chambers varying in volumetric capacity incident to rotation of said cam means, each of said chambers having communication with a pair of said registering inlet ports and one of said discharge ports, the pair of registering ports being located near one end of the chamber, the discharge passage near the other end thereof, discharge valving between said discharge passages and said discharge cavity, and valve means between said discharge cavity and said inlet port, said last valve means on the occurrence of a predetermined pressure in said discharge cavity operating to close off said inlet port to said inlet cavity and being further operable on the occurrence of a pressure in said discharge cavity higher than said predetermined pressure to interconnect the same with said inlet cavity.

2. A pump including: a first housing member having a plurality of inlet openings therein, a second housing member comprising inlet and discharge cavities and an inlet port serving said inlet cavity, a ring member fixed to said second housing member and rotatably supporting, with said first housing member, a drive shaft having a portion eccentric to the axis thereof carrying a cam ring spaced from said eccentric portion by anti-friction elements, said ring member having therein a plurality of inlet openings registering with said first-mentioned inlet openings, a plurality of inlet passages serving said first-mentioned inlet openings and a plurality of discharge passages, said inlet openings in said ring member and said inlet passages communicating with said inlet cavity, means mediate said first housing member and said ring member yieldably supporting a plurality of abutments engaging the outer surface of said cam ring, said abutments delineating a plurality of chambers varying in volumetric capacity incident to rotation of said cam ring, each said chamber having communication with a pair of said registering inlet ports and one of said discharge passages, the pair of registering ports being located near one end of the chamber, the discharge passage near the other end thereof, a band valve encircling said ring member and common to all of said discharge passages, said band valve controlling the fluid flow from said discharge passages into said discharge cavity, and valve means between said discharge cavity and said inlet port, said last valve means on the occurrence of a predetermined pressure in said discharge cavity operating to close off said inlet port to said inlet cavity and being further operable on the occurrence of a pressure in said discharge cavity higher than said predetermined pressure to interconnect the same with said inlet cavity.

3. A pump according to claim 2 wherein said last valve means comprises a tubular element carried by said second housing member and open at one end to said discharge cavity, said tubular element at its opposite end being surrounded by a plunger member spring biased in a direction toward said first-mentioned end of said element, said plunger being formed to provide a chamber for the reception of discharge fluid supplied through said element, said chamber including a surface against which such fluid reacts to shift the plunger.

4. A pump according to claim 3 where said plunger has therein a radial passage interconnecting said chamber and the inlet cavity when the shifting of the plunger is brought about by said higher pressure.

References Cited in the file of this patent

UNITED STATES PATENTS

| | | |
|---|---|---|
| 1,025,222 | Wallace | May 7, 1912 |
| 1,280,811 | Moss | Oct. 8, 1918 |
| 1,616,992 | Ruckstuhl | Feb. 8, 1927 |
| 1,663,647 | Brush | Mar. 27, 1928 |
| 2,279,176 | Pardee | Apr. 7, 1942 |
| 2,691,388 | Livers | Oct. 12, 1954 |
| 2,713,828 | Huber | July 26, 1955 |
| 2,732,126 | Smith | Jan. 24, 1956 |
| 2,736,267 | Moshbacher | Feb. 28, 1956 |